United States Patent [19]
Krehbiel et al.

[11] 3,804,171
[45] Apr. 16, 1974

[54] METHOD FOR RECOVERING HYDROCARBONS USING AN ANIONIC WATER FLOOD ADDITIVE

[75] Inventors: Delmar D. Krehbiel, Lubbock, Tex.; M. Duane Gregory, Ponca City; Charles R. Clark, Ponca City; Carl D. Kennedy, Ponca City, Okla.

[73] Assignee: Continental Oil Company, Ponca City, Okla.

[22] Filed: Jan. 15, 1973

[21] Appl. No.: 323,464

Related U.S. Application Data

[63] Continuation-in-part of Ser. No. 208,020, Nov. 24, 1971, abandoned.

[52] U.S. Cl.............. 166/270, 166/274, 166/275, 252/8.55 D
[51] Int. Cl............................................. E21b 43/22
[58] Field of Search .......................... 166/273–275, 166/270, 305 R; 252/8.55 D

[56] References Cited
UNITED STATES PATENTS

| | | | |
|---|---|---|---|
| 2,197,800 | 4/1940 | Henke et al. | 252/8.55 D |
| 3,111,984 | 11/1963 | Reisberg | 166/270 |
| 3,283,812 | 11/1966 | Ahearn et al. | 166/275 |
| 3,302,711 | 2/1967 | Dilgren | 166/270 |
| 3,302,713 | 2/1967 | Ahearn et al. | 166/275 X |
| 3,330,347 | 7/1967 | Brown et al. | 166/270 |
| 3,392,782 | 7/1968 | Ferrell et al. | 166/275 |
| 3,398,791 | 8/1968 | Hurd | 166/270 |
| 3,653,437 | 4/1972 | Gale et al. | 166/275 X |

*Primary Examiner*—Stephen J. Novosad
*Attorney, Agent, or Firm*—Ronald J. Carlson

[57] ABSTRACT

An improved anionic water flood additive and method of using same for the recovery of hydrocarbons from a petroliferous formation. The anionic water flood additive is an overbased sulfonate derived from pale oil extracts.

9 Claims, No Drawings

METHOD FOR RECOVERING HYDROCARBONS USING AN ANIONIC WATER FLOOD ADDITIVE

This application is a continuation-in-part application of an application having Ser. No. 208,020, filed on Nov. 24, 1971, now abandoned, and having co-pendency with the instant application.

BACKGROUND OF THE INVENTION

1. Field of the Invention

This invention relates to an improved anionic water flood additive. In one aspect the invention relates to the use of said anionic water flood additive for recovery of hydrocarbons from petroliferous subterranean strata. In yet another aspect, this invention relates to a process for the recovery of viscous oils from low permeability formations by the use of an overbased sulfonate derived from pale oil extracts.

2. Brief Description of the Prior Art

A large percentage of the oil in petroliferous strata is held within the rock of the strata by the surface forces between the rock, the oil and the formation water. As a result, a substantial portion of this oil usually remains in the rock even when wells traversing the strata are no longer productive. Various secondary recovery techniques, such as thermal recovery, gas injection and water flooding, have been suggested for the recovery of this fixed oil which remains in the formation after it can no longer be produced by primary recovery methods. Of these secondary recovery techniques, water flooding is quite commonly chosen, and a multitude of methods has been suggested for improving the efficiency and economy obtained from the practice. Such methods frequently include incorporation of a water-soluble surfactant in the water flood. Typical surfactants which have been proposed for this purpose include alkyl pyridinium salts, sodium lauryl sulfate, certain sulfonates, glycosides, sodium oleates, quarternary ammonium salts and the like. The use of such surfactants has arisen because it is widely recognized that a low interfacial tension between the surfactant flood water and the reservoir crude is essential to the improvement of recovery efficiencies.

Recently it has been proposed that nonionic surfactant solutions, such as polyoxyethylene-polyoxypropylene copolymer containing solution be injected into the formation through a first of at least two well bores to thereby displace the hydrocarbons towards a second well bore. The nonionic surfactant flood is then followed by the injection of a slug of aqueous caustic into the formation through the first well bore to displace the hydrocarbon and the surfactant toward the second bore. The caustic slug has a basicity at least 1.5 pH levels greater than that of the native formation water. However, the use of the nonionic surfactant has not fully met the needs of a desirable water flood additive surfactant composition and new compositions are constantly being sought which will allow one to recover the residual oil remaining in the formation. Further, the surfactant ingredients of the prior art have sufferrd from the lack of availability or cost and thus have not satisfied this long felt need.

OBJECTS OF THE INVENTION

An object of the invention is to provide an improved water flood additive and method for using same in the secondary recovery of hydrocarbons from oil bearing formations.

Another object of the present invention is to provide an improved water flood additive which is inexpensive and readily available in sufficient quantities to satisfy present and future needs.

Another object of the invention is to provide a water flood additive composition which will be effective in recovering the tertiary oil in the formation and which can be readily processed.

These and other objects, advantages, and features of the invention will become apparent to those skilled in the art from a reading of the following detailed description.

SUMMARY OF THE INVENTION

According to the present invention we have now found an improved anionic water flood additive which consists of an overbased sulfonate derived from pale oil extracts.

Further, according to the invention we have found that when employing said anionic water flood additive that hydrocarbons in substantial yields can be recovered from petroliferous formations.

One method of employing the anionic water flood additive composition of the present invention includes the step of injecting a slug of the overbased sulfonate derived from a pale oil extract into the formation to thereby displace the hydrocarbon from the formation so that one can recover the displaced hydrocarbon. Additional hydrocarbon can be recovered, if desired, by injecting an effective amount of a slug of aqueous alkali metal hydroxide and/or aqueous alkali metal carbonate into the petroliferous formation after the overbased slug has been injected.

Another method of removing the hydrocarbons from a petroliferous formation is by injecting a first slug of a sulfonate derived from a pale oil extract into the petroliferous formation followed by an effective amount of an aqueous alkali metal hydroxide solution and/or an aqueous alkali metal carbonate solution slug so that the overbased composition is produced in situ by the contacting of the sulfonate slug and the alkali metal hydroxide slug and/or aqueous alkali metal carbonate slug.

DESCRIPTION OF THE PREFERRED EMBODIMENTS

As previously stated, the present invention is an improved anionic water flood additive and a method of using same for the recovery of hydrocarbons from a petroliferous formation. The anionic water flood additive is derived from a pale oil extract which is sulfonated to yield sulfonic acid precursors, which when neutralized and overbased produces the anionic water flood additive for use in the present invention.

Pale oil extract is a term well-known in the oil industry for the aromatic containing extract recovered from a virgin crude oil. Basically, a virgin crude oil is distilled to provide a fraction from which lubricating oils can be obtained upon further processing. One step employed in this further processing is the extraction of the aromatic compounds from the lubricating oil fraction by its use of a suitable solvent, such as furfural. The extract so obtained is commonly referred to as "pale oil extract" or "neutral oil." The physical properties and compositions of the pale oil extract can vary widely depending upon the boiling point range of the lubricating oil fraction being extracted. Generally the pale oils will have an API gravity ranging from about 13 to 18.5 and a boiling point range at 10 mm pressure, of from about 275°F to about 675°F. Some specific examples of pale oil extracts which can be sulfonated and overbased to produce the anionic waterflood additive of the present invention are tabulated as follows:

|  | API Gravity | Boiling Point (°F at 10 mm) |
|---|---|---|
| 100 Pale oil extract | 18.1 | 368—598 |
| 170 Pale oil extract | 14.6 | 360—620 |
| 200 Pale oil extract | 13.4 | 400—630 |
| 400 Pale oil extract | 15.2 | 288—666 |

Once the desired pale oil extract has been obtained it is directly sulfonated and the sulfonated materials are preferably segregated from the unreacted materials. Any suitable sulfonation procedures which are well known in the art can be employed in the sulfonation of the pale oil extract. For example, the sulfonating agent may be either oleum, $SO_3$, mixtures of $SO_3$ and $SO_2$ or chlorosulfonic acid. Furthermore, the sulfonation can be carried out by either a batch-type process or a continuous falling film reaction process.

Neutralization of the sulfonic acids obtained by sulfonation of the above-described pale oil extracts to produce the alkali metal salts may also be carried out in any one of several methods well-known in the art. The alkali metal hydroxides and/or alkali metal carbonates are employed in the neutralization step above.

The term "base component" as used in this application includes either an alkali metal hydroxide or an alkali metal salt capable of neutralizing a sulfonic acid such as an alkali metal carbonate or bicarbonate. Examples of such alkali metal hydroxides and carbonates, i.e., base components, include sodium hydroxide, potassium hydroxide, lithium hydroxide, sodium carbonate, sodium bicarbonate, potassium carbonate, and the like. Especially desirable results have been obtained wherein the alkali metal hydroxides such as sodium hydroxide or potassium hydroxide are employed.

As previously stated, the improved anionic water flood additive of the present invention is an overbased sulfonate derived from a pale oil extract. The term overbased, as used in this application, is defined to mean that the ratio of "weight of base component in excess of that required to neutralize the sulfonate/weight of sulfonate" is in the range of 0.03 to 2.0. Most desirable results are effected when the ratio "weight of excess base component/weight of sulfonate" is in the range of 0.20 to 1.0.

It is apparent that when one merely neutralizes the sulfonic acids obtained by the sulfonation of the pale oil extracts and introduces a slug of the neutralized sulfonates into the formation that one must add a sufficient amount of the alkali metal hydroxide or the aqueous alkali metal carbonate in a second slug to insure that the water flood additive composition formed in situ in the formation is overbased in the prescribed ranges. When preparing the water flood additive composition of the present invention to be inserted into the formation as the overbased components it is evident that the neutralization step need not be an intermediate step but rather that sufficient base can be added to the sulfonic acid derivative to produce a product containing the above-prescribed amount of overbasing.

In describing the use of the anionic water flood additive of the present invention, two methods of injecting said additive into the petroliferous strata will be discussed. However, it should be understood that neither method is preferred over the other and that the particular method chosen will depend to a large extent upon the facilities available at the well site.

One method of employing the anionic water flood additive composition of the present invention is to inject a slug of the neutralized sulfonic acid, e.g., the sulfonate derived from a pale oil extract, through a well bore into the petroliferous subterranean strata from which the additional hydrocarbon is to be removed. After the sulfonate slug has thoroughly been dispersed into the strata an effective amount of an aqueous alkali metal hydroxide solution and/or an aqueous alkali metal carbonate solution in the form of a second slug, is introduced into the strata to allow formation of the water flood additive composition in situ in the subterranean strata. Experimental results have shown that when employing such a method a sufficient amount of the alkali metal containing solution must be injected into the formation to assure that the water flood additive will be overbased in an amount so that the ratio of "weight of excess base component/weight of sulfonate" is in the range of 0.03 to 2.0. If sufficient caustic is not added to reach the lower ratio of 0.03, minimum desirable results are not obtained. Likewise, cost and handling problems have been encountered when the amount of overbasing is beyond the upper limit of 2.0.

The second system which can be employed in using the anionic water flood additive composition of the present invention is to produce the overbased sulfonate and inject the overbased sulfonate derived from a pale oil extract directly into the petroliferous subterranean strata as one slug. When employing this procedure the same limitations as to the overbased sulfonate apply as to that described in the process above. While the overbased sulfonate derived from a pale oil extract has shown remarkable properties as a water flood additive, additional tertiary oil can be recovered by injecting an effective amount of an aqueous alkali metal hydroxide solution and/or an aqueous alkali metal carbonate solution into the formation which has previously been contacted with the overbased sulfonate composition. The amount and concentration of the aqueous alkali metal containing solution employed can vary widely. However, desirable results have been obtained wherein the concentration of the base component in the solution ranges from about 0.5% to 50% weight percent and the amount of solution injected into the formation is from about 10 to 1,000 volume percent, based on the amount of the sulfonate containing slug injected into the formation.

In order to more fully explain the present invention, the following examples are given. However, it is to be understood that the examples are not intended to function as limitations on the invention as described and claimed hereafter.

EXAMPLE I

A series of experiments were conducted to evaluate the oil recovery properties of the anionic water flood additive of the present invention. In each experiment 12 inches × 2 inches × 2 inches Berea cores were evacuated under vacuum and then saturated with 5 weight percent NaCl brine. The brine saturated cores were reduced to irreducible water saturation with 80 Pale oil and then water-flooded to residual oil saturation with a 5 weight percent sodium chloride brine solution. Two percent pore volume slugs of various water flood additives (calculated on the basis of the additives per se) were injected into the cores as 15 weight percent dispersions of sulfonate in aqueous mixture, and the tertiary water flood was conducted at 40 cc per hour, a flow rate equivalent to 6–7 feet per day to determine their effectiveness as oil recovery additives. The overbased anionic water flood additive compositions employed were prepared by sulfonating the desired pale oil extracts, neutralizing the sulfonate and then adding 50 weight percent of the base component to the neutralized sulfonic acids. The final additive composition contained the equivalent to about 4 percent excess of the hydroxide and 15% sulfonate present by weight. All of the oil recovery runs were conducted at 130°F. The results of the experiments are tabulated below.

TABLE I

| Surfactant | Excess NaOH (Wt.%) | Ratio [3] | Volume of Tertiary Oil Recovered (% of Pore Volume) |
|---|---|---|---|
| Nonionic [1] | 4 | 0.3 | 0.2 |
| Cationic [2] | 4 | 1.62 | 0 |
| Sulfonate of 100 Pale Oil Extract | 0 | 0 | 4.0 |
| Sulfonate of 100 Pale Oil Extract | 4 | 0.26 | 8.7 (avg.) |
| Sulfonate of 170 Pale Oil Extract | 0 | 0 | 3.0 (avg.) |
| Sulfonate of 170 Pale Oil Extract | 4 | 0.26 | 8.6 (avg.) |

[1] Octylphenoxypolyethoxyethanol
[2] Oil-soluble quaternary ammonium chloride - Because of solubility problems, the NaOH was added as a separate slug behind the cationic surfactant.
[3] The ratio is: weight of excess NaOH/weight of surfactant From the above data it is readily apparent that the anionic water flood additive composition of the present invention can be employed for the recovery of the tertiary oil whereas nonionic and cationic compositions have only minor affect. Further, the data clearly show the criticality of the overbase concept herein before discussed.

EXAMPLE II

A series of experiments were conducted to determine the amount of overbasing required to produce the desired anionic water flood compositions for the improved tertiary oil recovery properties. In each experiment the same procedure employed in Example I was used except that the amount of overbasing was varied as was the base employed. The results of such experiments are tabulated herein below.

TABLE II

| Surfactant (Sulfonate Derivative) | Base | Excess Base (Wt.%) | Ratio [3] | Volume of Tertiary Oil Recovered (% of Pore Volume) |
|---|---|---|---|---|
| 170 Pale Oil Extract | — | 0 | 0 | 3.0 (avg. 3 runs) |
| 170 Pale Oil Extract | NaOH | 0.7 | 0.047 | 5.6 |
| 170 Pale Oil Extract | NaOH | 3.9 | 0.26 | 8.4 |
| 170 Pale Oil Extract | NaOH | 2.1 | 0.14 | 6.8 |
| 170 Pale Oil Extract | NaOH | 6.8 | 0.45 | 7.0 |
| 170 Pale Oil Extract | NaOH | 4.0 | 0.27 | 8.6 (avg.) |
| 170 Pale Oil Extract | $Na_2CO_3$ | 13.0 | 0.87 | 6.6 |
| 170 Pale Oil Extract | $Na_2CO_3$ | 6.6 | 0.44 | 7.2 |
| 170 Pale Oil Extract | $Na_2CO_3$ | 3.5 | 0.23 | 5.4 |
| 170 Pale Oil Extract | LiOH | 4.0 | 0.27 | 9.4 |
| 170 Pale Oil Extract | LiOH | 2.4 | 0.16 | 8.8 |
| 170 Pale Oil Extract | KOH | 4.0 | 0.27 | 8.6 |

The preceding data clearly indicates that alkali metal hydroxides and alkali metal carbonates can readily be employed as the base component used in producing the overbased sulfonates of the present invention.

EXAMPLE III

A series of experiments were conducted to determine the effect on oil recovery of injecting a slug of base behind an initial slug of the neutralized sulfonate constituent. Substantially the same procedure was employed as recited in Example I, except that the overbased composition was formed in situ in the core being treated. Further the amount of the aqueous NaOH solution was varied to produce an overbased composition having the desired degree of overbasing. The results of these experiments are as follows:

TABLE III

| Surfactant (Sulfonate Derivative) | Base | Excess Base (Wt.%) | Ratio [3] | Volume of Tertiary Oil Recovered (% of Pore Volume) |
|---|---|---|---|---|
| 170 Pale Oil Extract | — | 0 | 0 | 3.0 |
| 170 Pale Oil Extract | NaOH | 4 | 0.27 | 8.6 (avg.) |
| 100 Pale Oil Extract | — | 0 | 0 | 2.6 |
| 100 Pale Oil Extract | NaOH | 4 | 0.27 | 8.7 (avg.) |
| 100 Pale oil Extract | NaOH | 2 | 0.13 | 7.0 (avg.) |

An additional experiment was conducted to determine the effect on oil recovery of injecting a slug of aqueous NAOH solution after the core had been treated with an overbased sulfonate derived from 100 pale oil extract. In this experiment the overbased sulfonate composition contained an excess of 4 weight percent NaOH and had a ratio (3) of 0.27. Substantially the same procedure was employed as recited in Example I for oil recovery of the oil by use of the overbased sulfonate composition except that the core being treated was a Meinerd core. The volume of tertiary oil recovered from the Meinerd core was determined to be 7.1 percent of pore volume. The core was then treated with the additional base component in an amount effective to produce an excess of about 8 weight percent of the NaOH and an additional ratio (3) of 0.53 in the core and an additional 4 percent of pore volume of oil was recovered. In other words, the total of oil recovered was 11.1 percent pore volume.

The above data clearly indicates that the amount of oil recovered can readily be increased when an additional slug of the base component is injected into the formation following injection of either the neutralized sulfonate and/or overbased sulfonate into said formation.

Having thus described the invention, we claim:

1. A method for recovering hydrocarbons from a petroliferous formation which comprises injecting into said formation an effective amount of an anionic water flood additive which consists essentially of an overbased sulfonate derived from pale oil extract, said overbased sulfonate containing an excess of base component over that required to neutralize the sulfonic acid precursor to the sulfonate such that the ratio: weight of excess base component/weight of sulfonate is about 0.03 to about 2.0, and withdrawing hydrocarbon from said formation which has been displaced by said anionic water flood additive.

2. The method of claim 1 wherein said pale oil extract has a boiling range of from about 275° to 675°F, (at 10 mm) an API gravity of from about 13 to 18.5, and the base component employed to neutralize and overbase said sulfonic acid precursor is selected from the group consisting of an alkali metal hydroxide and an alkali metal carbonate.

3. The method of claim 2 wherein the ratio is in the range of 0.20 to 1.0.

4. The method of claim 3 wherein the base component is selected from the group consisting of NaOH, LiOH, KOH, $Na_2CO_3$, $Li_2CO_3$ and $K_2CO_3$.

5. The method of claim 4 which includes the step of injecting into said formation subsequent to said anionic water flood additive an additional amount of from about 10 to 1,000 volume percent, based on the amount of the sulfonate containing slug of aqueous base component solution, the additional aqueous base component solution containing about 0.5 to 50 weight percent of base component based on the weight of the solution.

6. The method of claim 1 which includes the steps of forming the anionic water flood additive in situ by the sequential steps of:
   a. injecting into the formation an effective amount of a neutralized sulfonic acid derivative of the pale oil extract; and
   b. injecting into the formation an effective amount of a base component selected from the group consisting of an alkali metal hydroxide and an alkali metal carbonate in aqueous solution thereof to produce an overbased mixture from the sulfonate and the base component, the overbased mixture characterized by having a ratio of "weight of excess base component/weight of sulfonate" in the range of 0.03 to 2.0.

7. The method of claim 6 wherein the pale oil extract has a boiling range of from about 275° to 675°F, (at 10 mm), an API gravity of from about 13 to 18.5.

8. The method of claim 7 wherein the ratio is about 0.20 to about 1.0.

9. The method of claim 8 wherein the base component is selected from the group consisting of NaOH, LiOH, KOH, $Na_2CO_3$, $Na_2CO_3$ and $Li_2CO_3$.

* * * * *